US011969745B2

(12) United States Patent
Lee et al.

(10) Patent No.: US 11,969,745 B2
(45) Date of Patent: Apr. 30, 2024

(54) CONTAINER WITH REVERSIBLE DISPENSER

(71) Applicants: Peter Lee, Houston, TX (US); Adam Touzani, Houston, TX (US)

(72) Inventors: Peter Lee, Houston, TX (US); Adam Touzani, Houston, TX (US)

(*) Notice: Subject to any disclaimer, the term of this patent is extended or adjusted under 35 U.S.C. 154(b) by 0 days.

(21) Appl. No.: 17/735,138

(22) Filed: May 3, 2022

(65) Prior Publication Data

US 2024/0042470 A1 Feb. 8, 2024

(51) Int. Cl.
*B05B 11/10* (2023.01)

(52) U.S. Cl.
CPC ................................ *B05B 11/1046* (2023.01)

(58) Field of Classification Search
CPC ........ B65D 21/06; B65D 21/00; B65D 21/02; B65D 21/0209; B65D 21/023; B65D 21/0231; B65D 21/0234; B65D 21/0235; B65D 21/0237; B65D 21/0238; B65D 21/04; B65D 21/043; B65D 51/24; B05B 11/0037; B05B 11/0097; B05B 7/04; B05B 7/0408; B05B 11/1047; B05B 11/1045; B05B 11/10; B05B 11/1046
USPC ........................... 222/145.5, 321.9, 143, 401
See application file for complete search history.

(56) References Cited

U.S. PATENT DOCUMENTS

| | | | | |
|---|---|---|---|---|
| 2,546,681 A * | 3/1951 | Searer | A61J 11/045 | 215/11.5 |
| 2,760,665 A * | 8/1956 | Zenker | A61J 9/008 | 215/11.1 |
| 2,953,170 A * | 9/1960 | Bush | B65D 51/246 | 401/266 |
| 4,603,784 A * | 8/1986 | Chang | A61J 9/008 | 215/11.1 |
| 4,982,769 A * | 1/1991 | Fournier | A61J 1/20 | 604/416 |
| 2020/0115137 A1* | 4/2020 | Jo (Zee) | B05B 7/0408 | |

* cited by examiner

*Primary Examiner* — Vishal Pancholi
*Assistant Examiner* — Robert K Nichols, II

(57) ABSTRACT

A container including a storage chamber within which is located at least one concentrated product housed; a mixing chamber coupled to the storage chamber and capable of storing a pump dispenser assembly, wherein the storage chamber is isolated from the mixing chamber. Also included is a reversible middle section capable of connecting the pump dispenser at the center opening with the container mouth opening.

8 Claims, 4 Drawing Sheets

CONTAINER WITH REVERSIBLE DISPENSER

FIELD OF THE INVENTION

The present invention relates to a container and, in particular, to reusable containers with a pump dispenser and a dip tube, that are capable of housing a concentrated product and which may be stacked one upon another.

BACKGROUND OF THE INVENTION

This invention relates generally, to a container attached to a hand-operated dispenser or sprayer in which fluid or foam is dispensed from the container by a pumping or trigger action. Dispensers are typically provided with an internally threaded sealing cap for securing the dispenser body to a container of fluid to be dispensed.

It is common for product containers with pump dispensers, such as trigger pump spray, to have the product prediluted for immediate use. Once the spray bottle is empty, most users are inclined to throw the empty spray bottle away and purchase another diluted spray bottle, despite the fact that the empty spray bottle is still perfectly capable of dispensing fluid. The problem of this type of ready-to-use containers, is that water constitutes 90% of the product's weight and volume, an item that can easily be acquired at home. Another problem related to plastics waste is its long term harm to the environment.

A preferred solution is to use a housing which contains a dissolvable concentrate of the primary ingredient of the product in conjunction with the container. In such a use the customer will fill the container to a given level with a diluent such as water and release the concentrate solution. Housings for concentrates may include a cartridge, a packet or tablets that can be stored inside or outside the mixing chamber. Since pump dispensers have dip tubes which extend to the bottom of the container, the diluted product is now able to be dispensed upon actuation of the pump.

Pump based dispensers with spray nozzles take up nearly half the vertical space of a bottle which is necessary in order to accommodate a hand grip. The odd shapes of most dispensers however, make them impossible to be stacked over one another.

SUMMARY OF THE INVENTION

The container of the invention defines two separate chambers: a storage chamber within which at least one concentrated product may be located; a mixing chamber within which the concentrated product may be mixed with a diluent, such as water, and a two part closure element. Viewed from the top, the container of the invention can have a cross section that is substantially round, oval, square or rectangular, while the storage chamber can be in the form of a secondary container that can be externally or internally connected to the mixing chamber.

The container opening must be wide enough to allow for the insertion of a spray nozzle head. The closure element of the container is composed of a sealing cap in the form of a ring and extended by a middle section that connects directly or through a connector to a dispenser assembly. The middle section terminates with an outer flange at one end and connects at its center threaded opening with a pump dispenser such as a spray nozzle head.

The container cap of this invention is open at the top and includes an annular top panel portion and a skirt portion depending downwardly from the outer periphery of the top panel portion. The skirt portion incorporates threads on its inner surface to engage threads on the external neck of the wide-mouth container.

Pump dispensers are typically provided with an internally threaded sealing cap for securing the dispenser body to a narrow neck container. In the case of this invention, the container requires a much wider mouth opening, requiring a sloping funnel-like shape middle section capable of bridging the gap between the dispenser threaded sealing cap to the wider neck opening of the mixing container. The outer flange of the middle section is to be placed between the neck opening of the wide-mouth container and the container cap annular bottom panel portion.

The pump dispenser and the middle section can be inverted jointly or separately, and placed inside the mixing chamber in a compact configuration when there is no diluent in the mixing chamber. This makes the container easier to store, stack-up and transport.

However, when it is desired to dilute the concentrated product, the pump assembly may be inverted back, placed outside the mixing chamber and secured in an up-right extended position by the outer periphery of the container cap.

In the context of the present invention, the concentrated product may be in the form of a liquid, a gel or a solid, such as a powder, a cartridge or a tablet. Examples of liquid products that are provided or used in dispensers include, but are not limited to, soaps, shampoos, detergents, disinfectants, cleansers, hairspray, make-up, lotions, oils, scents, ointments, creams, antiperspirants, coloring products, medicines, skin care products, etc.

In an embodiment of the invention, the mixing chamber is detachably coupled to the storage container. For example, the storage chamber may be screwed on or it may be snap-fit onto the base of the mixing chamber. As such, the mixing chamber and the storage container may include a threaded coupling or a snap-fit coupling.

In another embodiment of the invention, the mixing chamber is configured to receive an inverted middle section integrally connected to a pump dispenser.

In another embodiment of the invention, the mixing chamber is configured to receive one or more housings for a dissolvable concentrate solution.

A primary advantage of the new dispenser-container is the economic savings realized by the manufacturing, packaging, bulk storage and shipping cost of a concentrate solution rather than a dilute solution of active substances such as detergents. A further advantage is the stackability of the new container, the reversible and storable dispensing mechanism and the versatility of housings containing different types of concentrated active ingredients.

The invention now being fully described, it will be apparent to one of ordinary skill in the art that many changes and modifications can be made thereto without departing from the spirit or scope of the invention set forth herein.

BRIEF DESCRIPTION OF THE PREFERRED EMBODIMENTS

DESCRIPTIONS OF THE PREFERRED EMBODIMENTS

Figure 1:
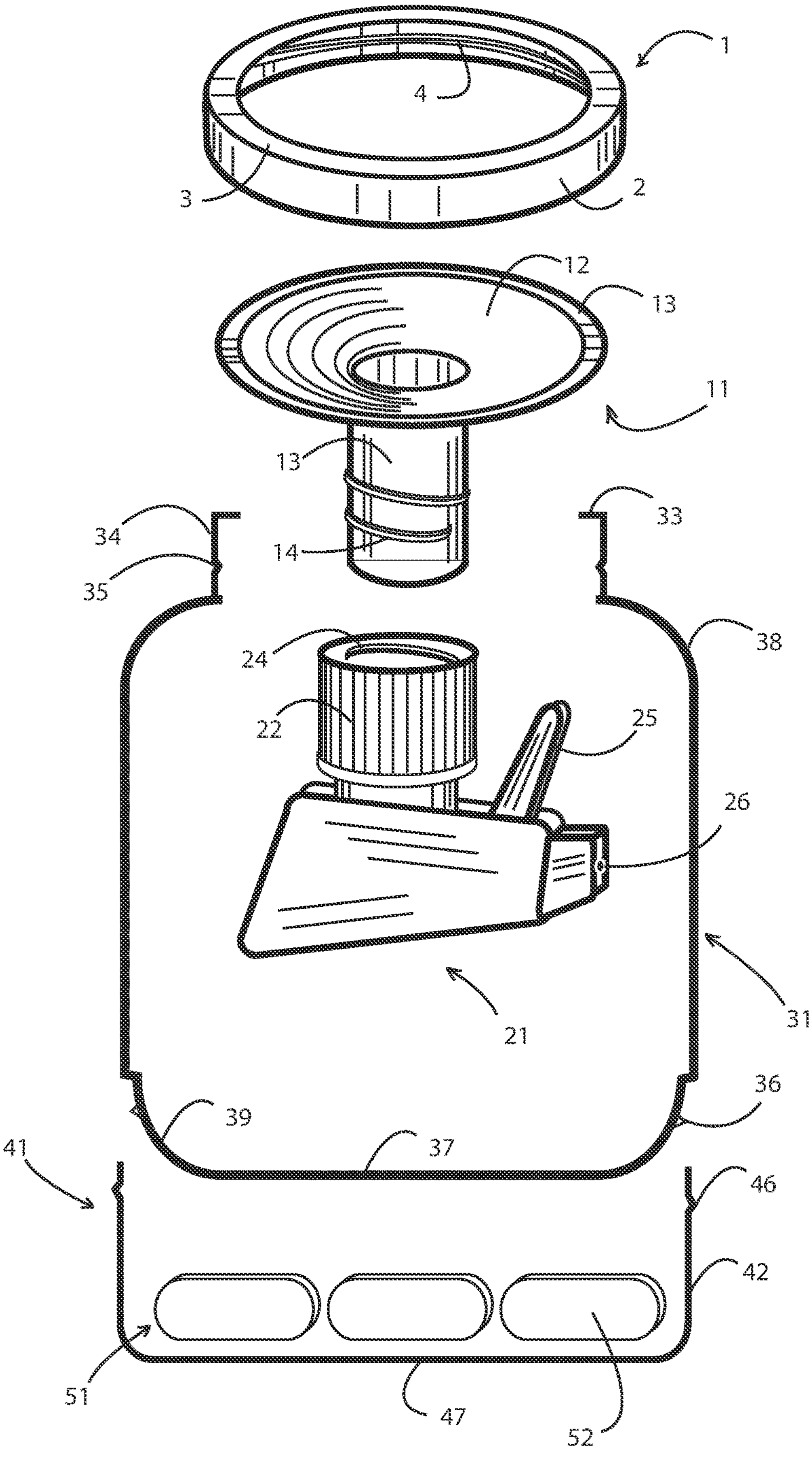
FIG. 1 shows a perspective, exploded view of a first preferred embodiment of an assembly according to the present invention.

FIG. 1 shows a container 31 in its collapsed configuration comprising 5 members; a mixing chamber 38, a storage chamber 41 for concentrates, a sealing cap 1 and a middle attachment section 11 that includes at its center a treaded tubular neck 14 for connecting a spray head dispenser 21 (shown inverted) and extending outwardly to reach annular flange or collar section 13.

Container 31 according to a first embodiment of the invention comprises a mixing chamber 38 which is generally tubular in shape with a cross section that can be substantially round, oval, square or rectangular. The mixing chamber 38 is blow-molded from a polymeric material such as PVC or PET for clarity.

Detachable sealing cap 1 is in the form of a screw-on lid. Plastic lid 1 is open at its center to include an annular top panel portion 3. The lid 1 includes a downwardly extending skirt 2, which defines a threaded portion 4 on the inwardly facing wall of the skirt 2. The neck portion 35 of the mixing chamber 38 carries a complementary threaded portion 34, such that the closure element 1 may be screwed onto or unscrewed from the open top end 35 of the mixing chamber 31.

Storage chamber 41 defined by a storage chamber body 42 includes a substantially cylindrical side wall, a closed bottom 47 and one or more concentrate housings 52. The chamber body 42 defines a threaded portion 46 on its inwardly facing wall. The base 39 of the mixing chamber 31 carries a complementary threaded portion 36, such that the storage chamber body 42 may be screwed onto or unscrewed from the base 39 of the mixing chamber 31. The bottom wall of the mixing chamber is represented by section 37. The mixing chamber and the storage container may include a threaded coupling or a snap-fit coupling.

The storage chamber includes a plurality of sealed housings 52. A concentrated product is located within each of the housings. The skilled person will appreciate that instead of the housings comprising relatively rigid bodies, the housings may instead comprise sachets, capsules, cartridges or tablets, which contain the concentrated product. In this embodiment, the storage chamber body 42 need simply be unscrewed from the mixing chamber 31 and one of the housings 52 removed from the storage chamber. The concentrated product located within the housing may then be released and mixed with a diluent as described above.

Figure 2:
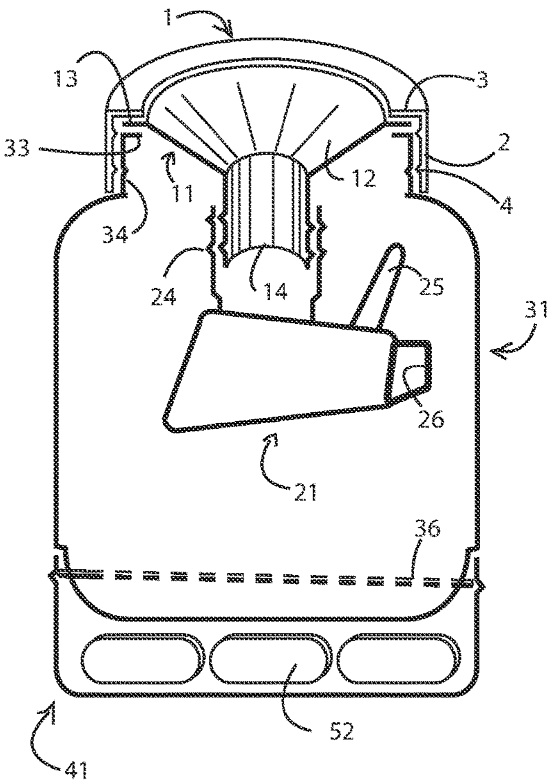
FIG. 2 is a front elevational cross section of a container-sprayer according to the invention in the collapsed storage position.

FIG. 2 shows a container 31 in its collapsed configuration as shown in FIG. 1 comprising all 5 members; a mixing chamber 38, a storage chamber 41 for concentrates, a sealing cap 1 and a middle attachment section 11 with a treaded tube for connecting spray nozzle dispenser 21 (shown inverted). The container 31 displayed in its assembled configuration, as it would be stacked up on the shelves with flat top and bottom sections, and ultimately presented for sale. Dotted line 36 may include a threaded coupling or a snap-fit coupling for connecting the base 39 of mixing chamber 31 to storage chamber 41.

Figure 3:
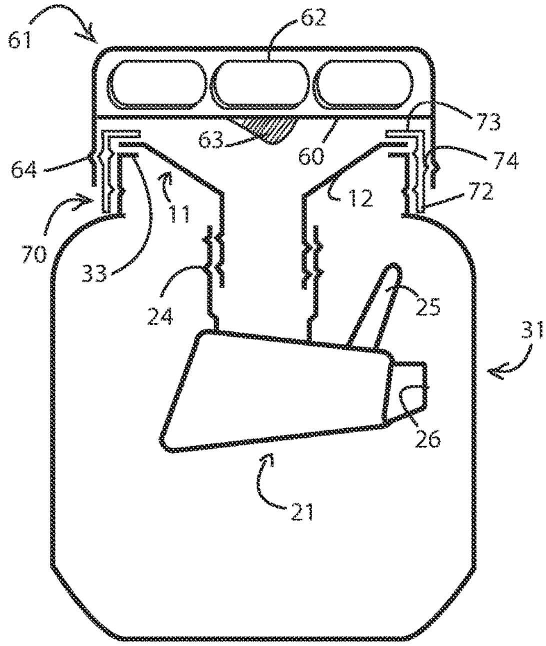
FIG. 3 is a front elevational cross section of a container-sprayer according to the invention in the collapsed storage position.

FIG. 3 shows a container 31 in its collapsed configuration as shown in FIG. 2 comprising all 5 members; a mixing chamber 38, a storage chamber 61 for concentrates, a sealing cap 70 and a middle attachment section 11 with a treaded tube for connecting spray nozzle dispenser 21 (shown inverted). Storage chamber 61 is located on the top portion and attached to container lid 31. Container lid 70 includes top panel 73 and skirt 72 with connecting means 74 and 64 to storage chamber 61. Storage chamber 61 connects to mixing camber 31 by means of a threaded screw-on coupling or a snap-fit coupling. Concentrate housings 62 are retained in the storage chamber 61 by removable foil seal 60 and pull tab 63. Other means for retaining housings inside storage chamber 61 are possible.

Figure 4:
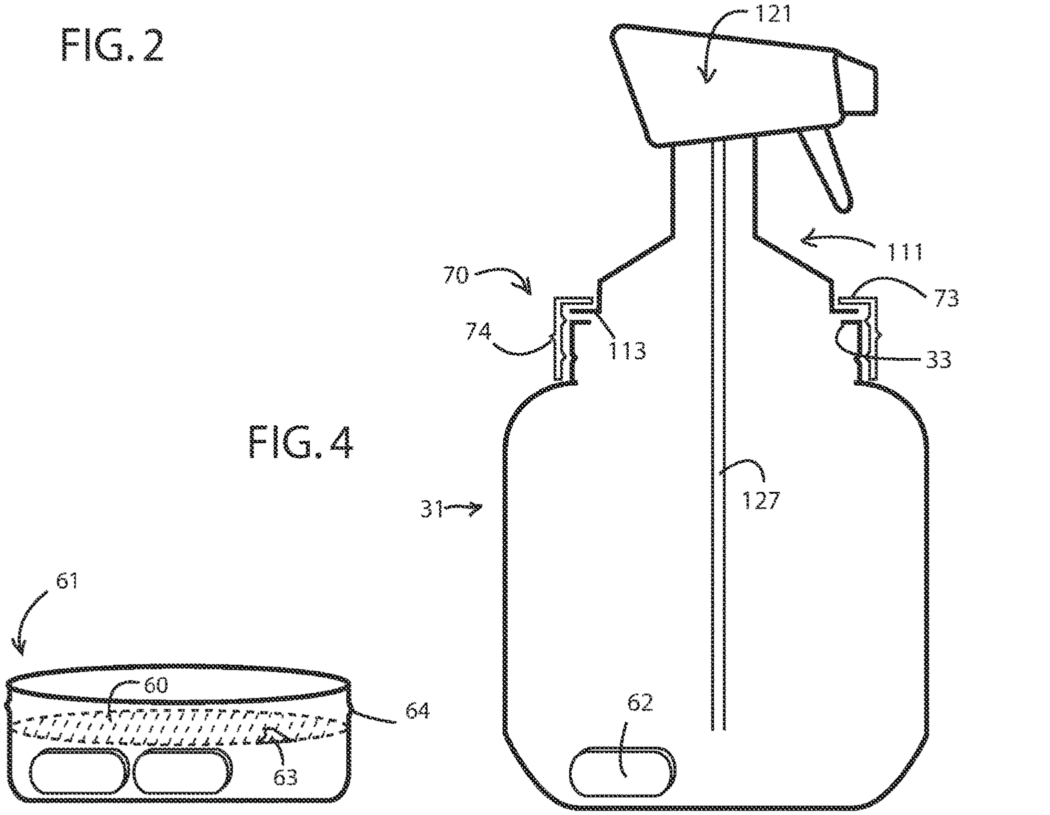
FIG. 4 is a front elevational cross section of a container-sprayer according to the invention in the expanded ready-to-use position.

The container 31 is displayed in its assembled configuration, as it would be stacked up on the shelves with a flat top and bottom sections FIG. 4 shows a container 31 in its expanded configuration comprising only 4 members; a mixing chamber 38, removed storage chamber 61 for concentrates, a container cap 70 and a middle attachment section 111 connected directly and without connector to spray nozzle dispenser 121 shown in an upright position. In this configuration, the spray nozzle neck is extended downwardly and outwardly through middle attachment section 111 and terminates at outer flat rim or flange 113. The container 31 is displayed in its working ready-to-spray configuration. Since pump dispensers have dip tubes 127 which extend to the bottom of the container, the diluted product is now ready to be dispensed upon actuation of the pump.

Figure 5:
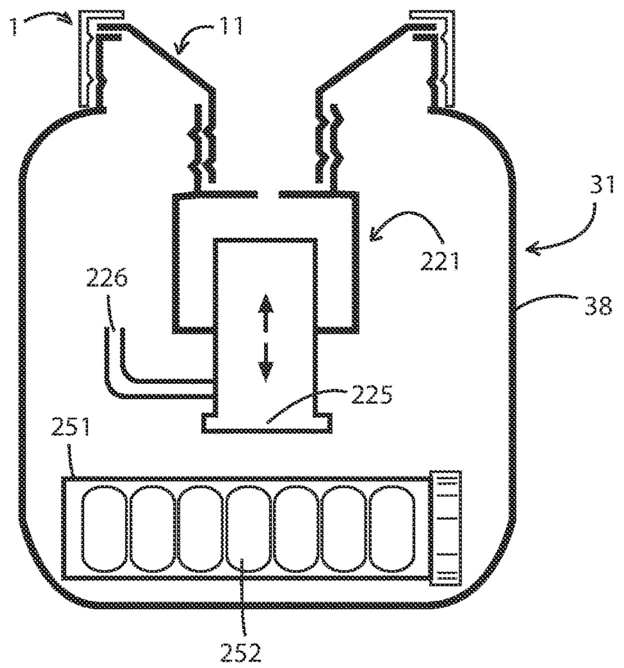
FIG. 5 is a front elevational cross section of a container-pump dispenser according to the invention in the collapsed storage position.

FIG. 5 shows a container 31 in its collapsed configuration as shown in FIG. 1 comprising all 5 members; a mixing chamber 38, a storage chamber in the form of a container for concentrates 251, a container cap 1 and a middle attachment section 11 including center treaded tube 14 for connecting hand pump dispenser 221 (shown inverted). The container 31 is displayed in its assembled configuration, as it would be stacked up on the shelves for storage or display. The storage chamber 41 has been eliminated since the concentrate housings 52 are combined into a container 251, now inserted directly into the mixing chamber 31.

Figure 6:
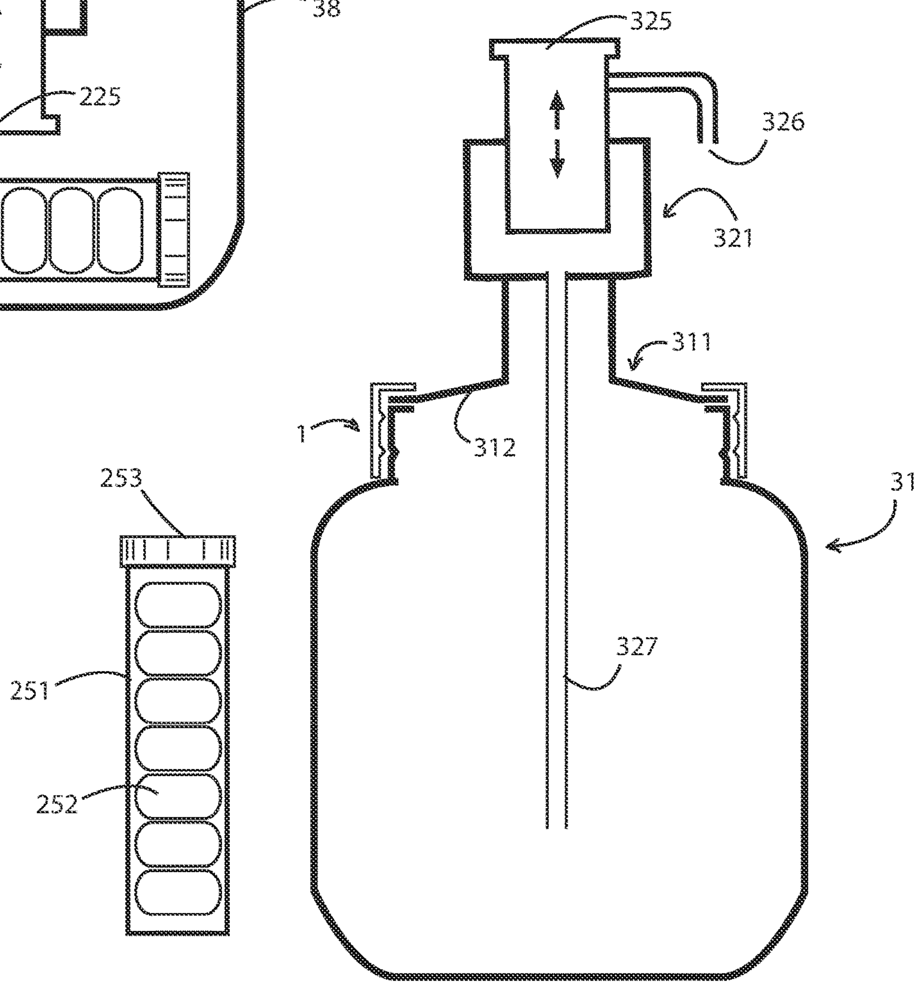
FIG. 6 is a front elevational cross section of a container-pump dispenser according to the invention in the expanded ready-to-use position.

FIG. 6 shows a container 31 in its expended upright configuration, comprising only 4 members; a mixing chamber 38, a storage chamber 351 for concentrates, a container cap 1 and a middle attachment section 311 and dispenser 321 inverted back to an upright position. The conical section 312 shown in previous figures as 12 is now substantially flat. The container 31 is displayed in its working configuration since pump dispensers include dip tubes which extend to the bottom of the container, the diluted product is now ready to be dispensed through opening 326 upon pressing the hand pump 325. The container 351 for concentrate housings has been removed from the mixing chamber to allow for the concentrate mix to be diluted. The container 351 with closure 353 can take the form of a dispensing bottle in case the concentrated product is in liquid form. Concentrate housings can be in the form of capsules, tablets, cartridges or packets.

Figure 7:
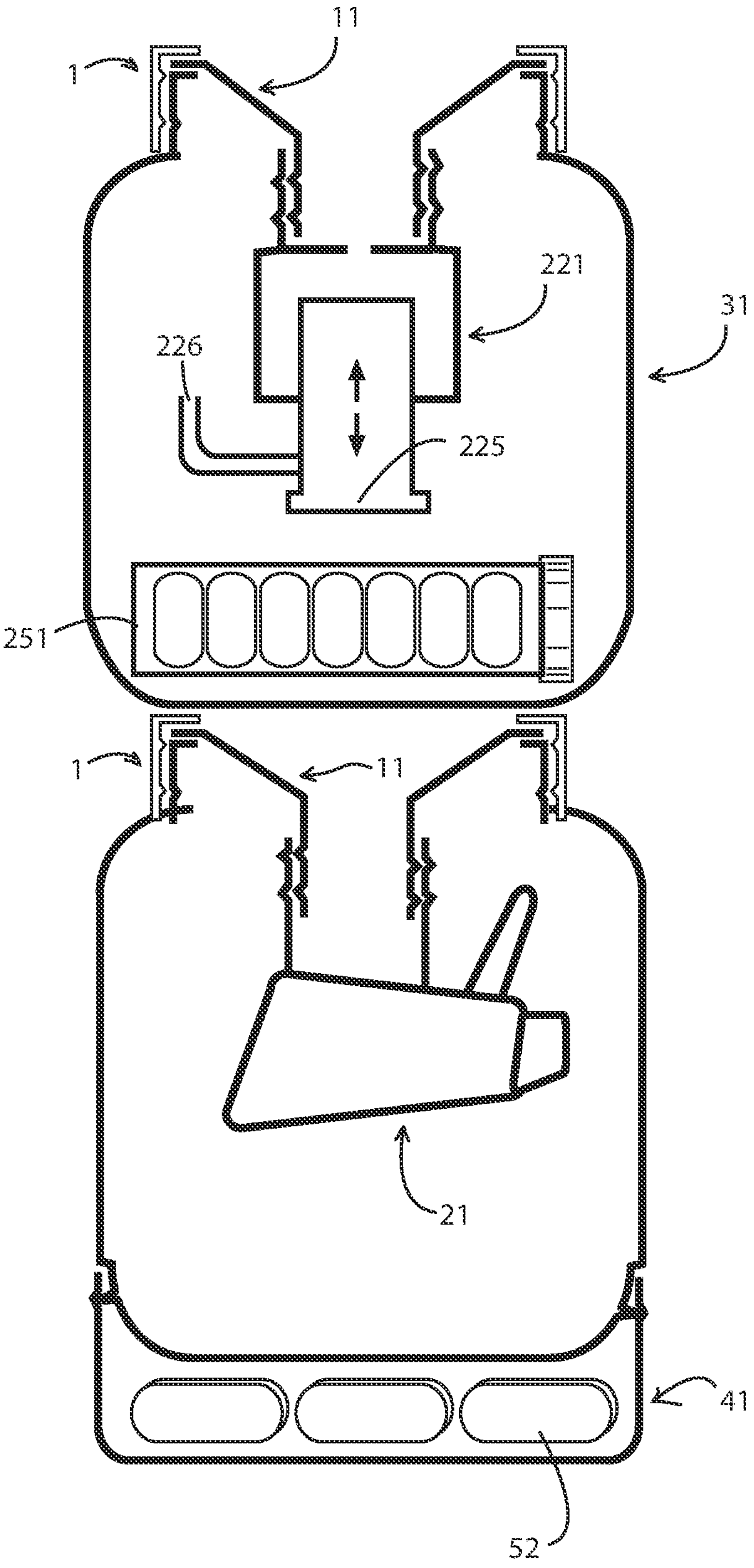
FIG. 7 is a front elevational cross section of a container-sprayer and a container-pump according to the invention in a stackable position.

FIG. 7 shows a container-sprayer as in FIG. 2 and a container-pump as in FIG. 5 in their collapsed configurations. The middle attachment section 11 have been inverted downwardly together with attached sprayer 21 and hand pump dispenser 221. In this configuration, the containers are able to be stacked up vertically on a shelf and require less space for storage and transport.

As various changes could be made in the above construction without departing from the scope of the invention, it is intended that all matter contained in the above description or shown in the accompanying drawings shall be interpreted as illustrative and not in a limiting sense. The invention therefore shall be limited solely by the scope of the claims set forth below.

The invention claimed is:

1. A container comprising a storage chamber within which is located at least one concentrated product housed; a mixing chamber coupled to the storage chamber and capable of storing a pump dispenser assembly with a dip tube while the mixing chamber is empty, whereas the storage chamber is isolated from the mixing chamber; comprising a middle section capable of connecting a pump dispenser to a center threaded tube opening, while an outer flange of the middle section is placed directly over a container mouth opening; wherein the middle section is reversible and wherein the annular outer flange bottom panel is able to engage with a top opening edge of the container.

2. The container of claim 1, wherein the middle section and the dispenser head are seamlessly connected into one combined unit.

3. The container of claim 1, wherein a container's detachable sealing cap is in the form of a screw-on lid open at a center to include an annular top panel portion.

4. The container of claim 1, wherein the middle section is connecting a sealing cap of the pump dispenser to the center threaded tube opening, and extending outwardly to reach a top periphery of the container mouth opening; wherein the middle section is reversible wherein an outer flange can sit on top of the container mouth opening on either side of the outer flange; wherein a container cap is open at the top and includes an annular top panel portion and a skirt portion depending downwardly from an outer periphery of the annular top panel portion; wherein the skirt portion incorporates threads on an inner surface to engage threads on an external neck of the wide-mouth container.

5. A container comprising a storage chamber within which is located at least one concentrated product housed; a mixing chamber coupled to the storage chamber and capable of storing a pump dispenser assembly; and a reversible middle section capable of connecting the pump dispenser assembly at a center opening with an outer flange that sets on top of a container mouth opening.

6. The container of claim 5, wherein the cap is open at center and includes an annular top panel portion, an annular bottom panel portion that engages the outer flange of the middle section, and a skirt portion depending downwardly from the outer periphery of the top panel portion; wherein the skirt portion incorporates threads on an inner surface to engage threads on an external neck of the wide-mouth container.

7. A container for mixing concentrated products and capable of storing a pump dispenser head comprising: a reversible middle section capable of connecting a pump dispenser at a center threaded opening with the container mouth opening; wherein the reversible middle section extends outwardly and terminates with an annular flange that engages a top section of a container mouth opening.

8. The container of claim 7, wherein a cap is open at a center and includes an annular top panel portion, an annular bottom panel portion that engages an outer flange of the middle section, and a skirt portion depending downwardly from an outer periphery of the top annular panel portion wherein the skirt portion incorporates threads on an inner surface to engage threads on the external neck of the wide-mouth container.

* * * * *